United States Patent
Ur

[15] 3,699,437
[45] Oct. 17, 1972

[54] BLOOD COAGULATION DETECTION METHOD AND APPARATUS

[72] Inventor: Amiram Ur, 79 North End House, Fitzjames Avenue, London, England

[22] Filed: Aug. 21, 1969

[21] Appl. No.: 863,411

[30] Foreign Application Priority Data

| Sept. 27, 1968 | Great Britain | 46,141/68 |
| Oct. 2, 1968 | Great Britain | 46,771/68 |
| Oct. 7, 1968 | Great Britain | 47,540/68 |
| Oct. 30, 1968 | Great Britain | 51,552/68 |

[52] U.S. Cl. ............... 324/65 R, 23/230 B, 324/65 P
[51] Int. Cl. ....................... G01r 27/02, G01n 33/16
[58] Field of Search ............... 324/65 B, 62, 57 B, 30; 23/230

[56] References Cited

UNITED STATES PATENTS

| 3,524,727 | 8/1970 | Möller | 324/65 R |
| 2,555,937 | 6/1951 | Rosenthal et al. | 324/30 |
| 3,374,672 | 3/1968 | Horne | 324/30 B X |
| 3,467,862 | 9/1969 | Vatmakher et al. | 324/39 X |

FOREIGN PATENTS OR APPLICATIONS

| 781,058 | 8/1957 | Great Britain | 324/30 B |
| 707,914 | 4/1954 | Great Britain | 324/30 |

Primary Examiner—Alfred E. Smith
Attorney—William C. Nealon, Noble S. Williams and Robert J. Bird

[57] ABSTRACT

Detecting blood clotting (coagulation) and determining clotting time by comparing the electrical resistance of two parts of a liquid blood sample, one of which is treated to delay or prevent its coagulation. Time or rate of clotting is determined by the rate of change of electrical resistance or impedance of the sample falling to a minimum or substantially zero at the commencement of coagulation whereafter the comparative impedance begins to increase with time. Coagulation is detected by the incidence of minimum comparative impedance. Apparatus includes an electrical bridge measuring circuit having a test cell containing an untreated part of the blood sample in one arm of the bridge and a similar test cell in the other arm of the bridge containing the part of the sample which is treated to delay or prevent coagulation. Electrodes in each test cell place corresponding parts of the blood sample in series circuit with their respective arms of the electrical bridge.

15 Claims, 7 Drawing Figures

INVENTOR.
AMIRAM UR
BY
William C. Nealon
ATTORNEY

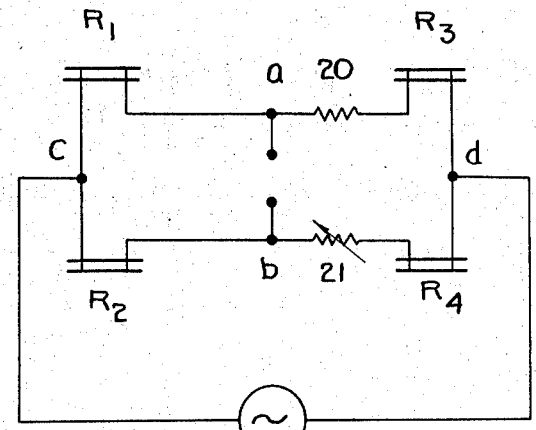
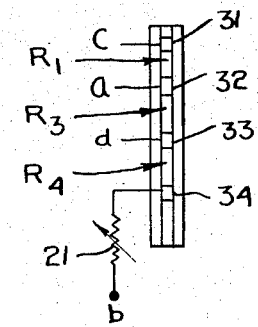
Fig. 4  Fig. 4a
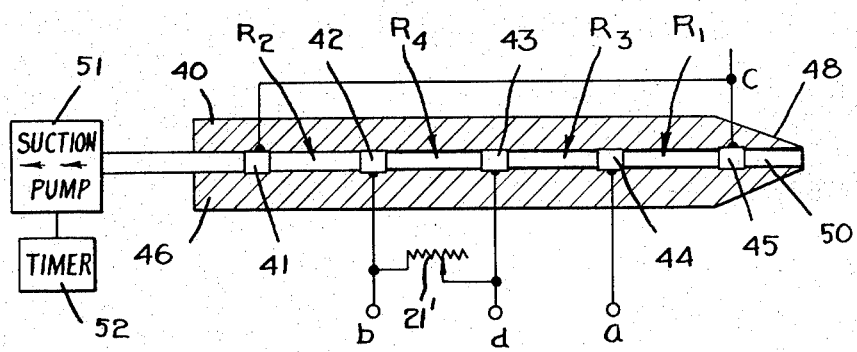
Fig. 5
INVENTOR.
AMIRAM UR

BLOOD COAGULATION DETECTION METHOD AND APPARATUS

BACKGROUND OF THE INVENTION

1. Field of the Invention

Testing for blood coagulation, commonly termed clotting with particular reference to detecting the occurrence of blood coagulation and measuring its clotting time.

2. Description of the Prior Art

The examination of blood clotting is, at present, one of the commonest tests performed in a clinic and in a hospital laboratory. The blood clotting time is an essential parameter in controlling the anti-coagulant treatment of patients suffering from acute coronary thrombosis, thrombophlebitis, pulmonary infarctions and other thromboembolic disorders. It is also one of the preliminary tests performed in the diagnosis and follow up of various bleeding disorders.

A new area, in which clotting time has increasing importance, is the study of cases suffering from a tendency to thrombotic phenomena, such as post operative patients, some cases of hyperlipidaemia, carcinoma of the pancreas and so forth. These patients are often found to have reduced clotting time.

The mechanism of blood clotting involves numerous factors, for example, platelets, enzymes and ions and is too complicated for detailed analysis in each case. The clinician has therefore to accept tests which point to the efficiency of the clotting mechanism as a whole, or to a particular stage of it, for example the prothrombin time.

There are, at the present time four main methods for the detection of clotting (coagulation), and the determination of clotting time.

The first method is known as the Lee and White Test Tube Method. Venous blood is placed in three test tubes, kept at 37° C. in a water bath. The clotting time is determined by tilting the first and then the second test tube at one minute intervals and recording the time at which a firm clot has formed in each of them in turn, and then detecting the coagulation of the blood in the third tube to give the coagulation time.

A second method is known as the Capillary Tube Method. A glass capillary is filled with blood from a finger puncture. Short pieces of the capillary are broken off at regular intervals, until a blood clot appears between the broken parts of the capillary.

The third method for determining the appearance of the clot is the Thromboelastogram Method. A fork, moved in the blood or plasma sample is used to sense the viscosity, which increases at the time of coagulation.

The fourth method of recording the occurrence of clotting is by monitoring the transluscency of a blood plasma sample after it has been isolated from the blood. With the appearance of the clot the sample becomes opaque.

All these methods are time consuming. The Lee and White test, performed at the bed-side, is often carried out by the busy house physician, who may have to spend fifteen to twenty minutes on the test in cases with normal clotting time, while in those with prolonged clotting time the time spent is correspondingly prolonged. The method also involves venous puncture and withdrawal of 6 to 9 cubic centimeters of blood, and hence is hard to perform more than twice or thrice a day.

The capillary tube method, though perhaps easier to perform, is considered by many clinicians to be unreliable.

The thromboelastogram method and the method of detection of clotting by changes in optical transluscency can, in practice, only be performed under laboratory conditions. Because of the time and labor that these procedures consume, these tests usually can only be carried out once or twice a day. Moreover, the results of these tests are conveyed to the clinician from the laboratory after a considerably delay.

The absence of a method capable of providing frequent, accurate and convenient determination of clotting time or any of the tests using clotting as its end point deprives the physician of valuable data which is most important in the handling of patients on anticoagulant therapy. Consequently, anticoagulant treatment has to be given with a wide safety margin which reduces the efficiency of the treatment.

The present invention is concerned with novel apparatus and method for providing frequent, accurate and convenient determination of the occurrence of blood clotting and of clotting time.

SUMMARY OF THE INVENTION

In accordance with one aspect of this invention, the coagulation of a liquid blood sample is detected by monitoring the electrical impedance of the sample and noting when it falls to a substantially minimum value. The term "electrical impedance" is used in this specification to denote the comparative impedance between two samples, one of which provides a control sample in which clotting is delayed, as well as the absolute impedance. The comparative impedance is suitably determined by a bridge circuit having in one arm the sample under examination and in a control arm a second sample of the blood suitably treated, for example by heparin to delay coagulation.

In accordance with a second aspect of the invention the coagulation of a liquid blood sample is determined by the rate of change of the electrical impedance of the sample reaching substantially zero.

The invention also includes apparatus for carrying out the invention and including a bridge measuring circuit having one arm formed by, or adapted to receive, a test cell containing electrodes and for the reception of a first part of a blood sample to be examined, the adjacent parallel arm being formed by, or adapted to receive, a control cell for the reception of a second part of the blood sample whose coagulation is delayed or prevented. The control cell is preferably of identical construction to the test cell. By using a bridge circuit to balance the control cell impedance against the test cell impedance, fluctuations in the absolute impedance of the blood caused by factors not related to coagulation are cancelled out and the degree of balancing of the bridge is related solely to the comparative impedance, that is to say the difference in impedance of the two cells which result from the approaching coagulation of the blood in the test cell. The bridge may be balanced when the electrical impedance is measured or it may be unbalanced a predetermined constant amount.

The invention is based on my discovery that the electrical impedance of blood when measured with a bridge using a control blood sample in which coagulation is delayed, does not remain constant during clotting, but falls to a minimum value which, from comparative tests with modification of known methods referred to earlier, appears to coincide with the coagulation. As the clot retraction progresses the electrical impedance of the blood sample then rises.

The incidence of coagulation may be detected either directly from a function of the changing electrical impedance, or indirectly from the first time derivative of the function.

As the invention results in a new way of detecting when coagulation occurs, it also may be used to provide a novel and accurate measure of the blood clotting time.

Thus, in accordance with a third aspect of the invention a method of determining the clotting time of a fresh blood sample comprises measuring the time taken for the electrical impedance of the sample to descend to a substantially minimum value.

An alternative method of determining the blood clotting time of a fresh blood sample comprises, in accordance with a fourth aspect of the invention, measuring the time taken for the rate of change of the electrical impedance of the sample to fall to substantially zero.

The clotting time may be measured by using a continuously operating recorder to plot against time the comparative electrical resistance of the blood sample so that a visual record of the changing electrical impedance of the sample is obtained. Alternatively the time may be measured by a suitably arranged timing device, this being particularly well suited to the fourth aspect of the invention as the timing device may be started when the blood sample is first taken and stopped, automatically, when the differentiated value of the impedance falls to substantially zero.

The discovery that the electrical impedance of a liquid blood sample measured as described above varies progressively to a minimum value occurring at coagulation, may be used to signify the proximity of coagulation before coagulation actually takes place.

For example, the passage of the time derivative of the electrical impedance through a predetermined value less than zero may be used to signify that coagulation is shortly to take place and the test cell containing the sample blood may then be flushed out before coagulation actually takes place and while the blood is still liquid.

A fifth aspect of the invention is that it enables the blood clotting time of a patient to be graphically represented so that changes in the blood clotting time which might indicate correction treatment being necessary can be detected. For example, the blood clotting time of a patient may be measured at predetermined intervals throughout the day and recorded against time to produce a curve representing the variations in the blood clotting time. A visual examination of the curve enables a doctor to see immediately whether the patient requires anti-coagulation treatment, such as an infusion of heparin. Indeed, the recorder may be arranged to provide an alarm if the curve of the blood-clotting time exceeds predetermined upper and lower limits, or if its gradient indicates that some sort of remedial treatment is necessary. The recorder may also be associated with a controller which automatically responds to the predetermined limits being exceeded, by initiating infusion of the patients blood with a suitable agent to restore the clotting time to between the limits. The graphical representation of the clotting time also lends itself to studying the influence of certain foods, on the patients blood clotting time so that the patient can be warned against eating them if they have an adverse effect.

In a sixth aspect of the invention, the proximity of coagulation of a liquid blood sample is detected by the blood impedance or its time derivative attaining a predetermined value.

The invention also includes apparatus for carrying out any of the six aspects mentioned above.

In one arrangement of such apparatus there is provided two blood holding cells each having two electrodes which contact the blood and which are connected in a network which provides an output dependent on the difference between the electrical impedance measured between the electrodes of one cell and the electrical impedance between the electrodes of the other cell. The output may be a simple yes/no signal or it may provide a continuous record of the changing difference in electrical resistance of the blood in the two cells. Preferably the network is constructed as a bridge which enables the electrical resistance difference to be measured accurately. The bridge may be a conventional four-armed Wheatstone bridge arrangement utilizing a continuously balancing member whose movements to keep the bridge balanced are used to provide the output to, for example, a pen recorder or some form of differentiating component, either electrical or mechanical.

Each cell preferably is formed in the bore of an insulating tube having cylindrical axially spaced electrodes lining its wall. The tube may be glass and it may be provided with several similar electrode pairs providing respective arms of a bridge circuit. The electrodes are suitably interconnected, where required, either within or externally of the tube and may be provided by annular gold/platinum linings on the inside wall of the tube. Other electrode materials may also be used.

In the preferred apparatus for carrying out the invention the sample under test forms one arm of a bridge having in one or more of its other arms identical blood samples in which, however, coagulation is prevented or delayed. This must be done in a way which does not alter the accuracy of the apparatus. One such way is to siliconize the insulative surfaces of the arms other than the electrodes with which the blood comes into contact. A second way is to add heparin, an anti-coagulant, to the blood in the arms. During operation of the apparatus the blood sample under examination forms one arm of the bridge and the blood in the other arms provide references susceptible to the same factors other than coagulation, which affect impedance, such as red blood cell sedimentation. Thus the output from the bridge reflects the difference in the electrical impedances of the two samples due to coagulation and is not distorted by such factors which are cancelled out in the bridge arms.

One construction of cell providing a siliconized surface between a pair of electrodes is constituted by placing in the bore of a glass tube a block of silicone sandwiched between two blocks of graphite. The blocks are then drilled from one end of the tube to provide a hole passing through both the graphite and the silicone blocks. The two graphite blocks provide respective electrodes of a cell and the internal cell surface between the electrodes, being silicone, delays the coagulation of the blood within it. Such a construction of cell may be used for the control cell in a bridge measuring circuit.

In the preferred aspect of the invention an alternating potential to say 10 kilocycles is applied to the blood to measure its electrical impedance.

The present invention will be more fully understood with reference to the following more detailed description when taken with the accompanying drawings; in which:

DESCRIPTION OF THE DRAWINGS

FIG. 4 shows an alternative arrangement of resistance measuring circuit;

FIG. 4a is a detailed view of a circuit component useful in the measuring circuit of FIG. 4; and FIG. 5 shows a construction of capillary tube which may be used to provide cells of the bridge.

DESCRIPTION OF THE PREFERRED EMBODIMENTS

Figure 1:
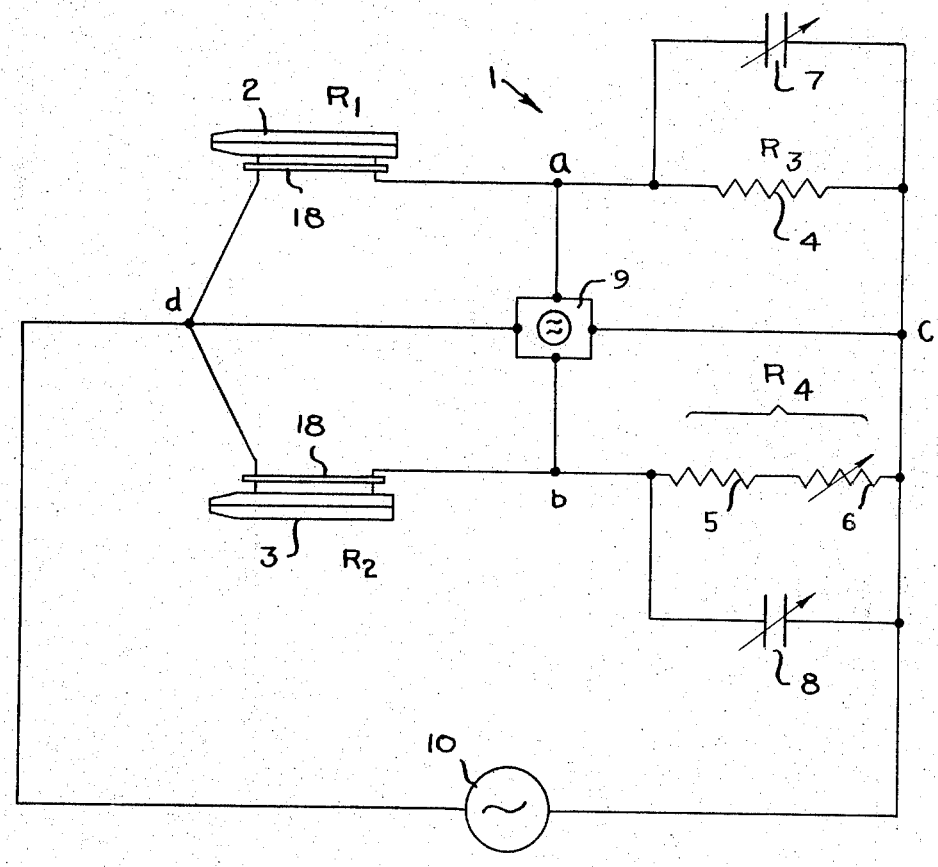
FIG. 1 is a circuit diagram of apparatus for measuring the comparative electrical impedance between a control cell and a test cell both containing blood from the same sample.

FIG. 1 shows a bridge circuit 1. One arm of the bridge comprises a cell 3 in which coagulation occurs and which is arranged electrically in series with a second arm of the bridge formed by a 20 kilohm resistor 5 in series with a 10 kilohm adjustable resistor 6. A control cell 2 provides the third arm of the bridge and a 25 kilohm resistor 4 provides the fourth arm of the bridge.

The bridge is supplied with a 10 kilocycle 1.2 volt (peak to peak) sinusoidal voltage obtained from a battery powered oscillator 10. Two air filled variable trimmer capacitors 7 and 8 each of the value variable from 3 to 30 pico-farads are connected in parallel with the second and fourth arms of the bridge, respectively, to allow accurate balancing. A double beam oscilloscope 9 is connected across the measuring terminals of the bridge and has one beam displaying the voltage difference between the measuring terminals a and b of the bridge, using a sweep rate of 20 microseconds per centimeter and a sensitivity of 1 millivolt per centimeter, while the other beam of the oscilloscope monitors the electrical supply from the oscillator 10 as applied at the other pair of bridge terminals c and d.

Figure 2A:
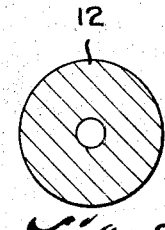
FIGS. 2 and 2a are detailed views of a circuit component of FIG. 1.
Figure 2:
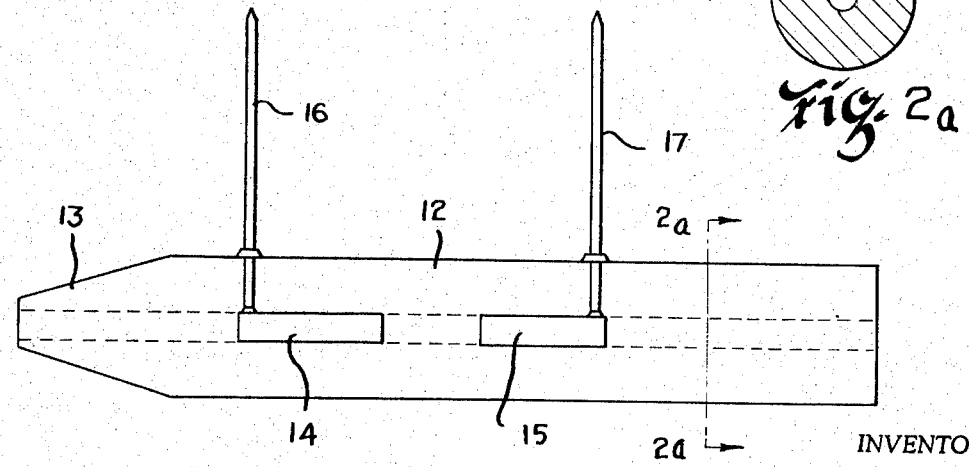

FIG. 2 shows the construction of one of the two cells 2 and 3 which are identical as far as possible. The cell is made from a thick walled glass capillary 12 having a 5 millimeter external diameter, a 2 millimeter internal diameter and a axial length of 40 millimeters. One end of the capillary tube is bevelled at 13.

The cell provided by the tube 12 has two gold/platinum electrodes 14, 15 prepared by painting the inside of the capillary tube with platinum-gold alloy paste, so as to form two cylindrical bands of width 5 millimeters and thickness 0.1 millimeters which are separated from one another by an axial distance of 10 millimeters. The glass tube 12 is baked at 620° centigrade for 3 to 4 hours and then slowly cooled to room temperature during a period of 10 hours to provide a firm cylindrical platinum/gold film at the places where the paste is applied. Two radial holes, each of half a millimeter in diameter, are respectively radially drilled by ultrasonic techniques through the wall of the glass tube and have threaded through them respective copper pins 16, 17 serving to connect the electrodes to external circuitry. The copper pins are soldered to the electrodes and are bonded to the glass tube of the cell by a suitable epoxy resin. Each of the cells 2, 3 of FIG. 1 is mounted on an electrical socket 18 from which it can be easily removed for cleaning and replacement.

Before using the apparatus the two cells 2 and 3 are cleaned with a detergent solution and then placed in boiling water for twenty minutes to ensure destruction of any enzyme traces present which might interfere with the natural coagulation of the blood. Finally the cells are dried. The cell 2 is a control cell has deposited inside it by a tuberculin syringe about 0.001 cubic centimeters of a 50 milligram per cubic centimeter solution of heparin which is a commonly used anticoagulant.

Blood to be examined is obtained by a finger puncture and the first drop is discarded to avoid tissue debris. The two sample cells 2 and 3 are then filled with the aid of a pipette from the second drop of blood on the finger. The control cell 2 is filled last to avoid heparin contamination of the blood. It will be appreciated that the use of the two cells 2 and 3 in the bridge enables the effects of impedance changes caused by processes other than clotting, such as cooling of the blood, sedimentation of the red blood cells and so forth, to be eliminated.

Figure 3:
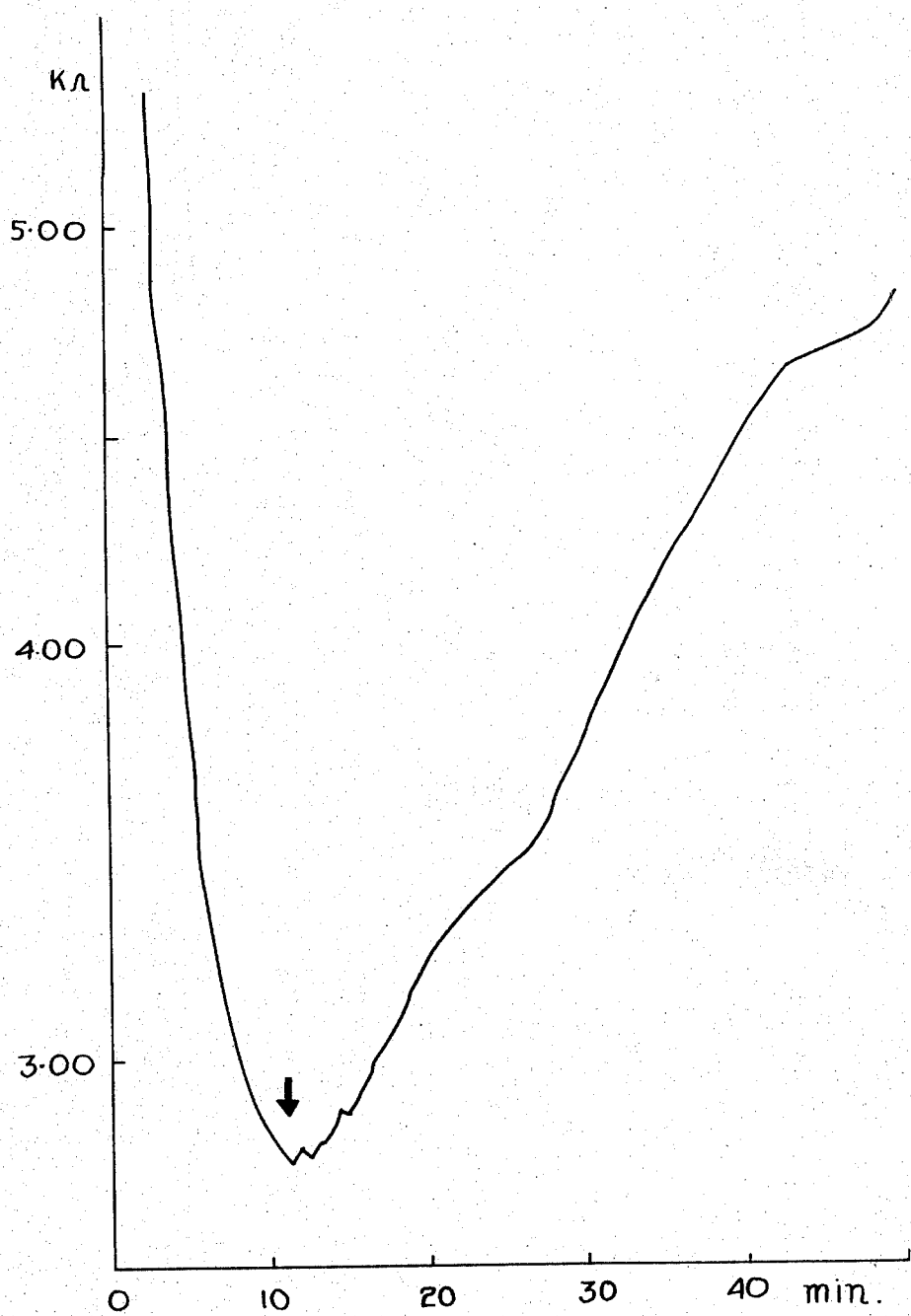
FIG. 3 shows graphically the change in electrical resistance difference up to and following coagulation.

FIG. 3 shows graphically the changes in the comparative electrical impedance, as measured by a variable resistor 6, of a blood sample as measured during one experiment using the apparatus shown in FIGS. 1 and 2. In FIG. 3, the abscissa represents time in minutes from the point at which the first cell 3 is filled and the origin corresponds in fact to less than half a minute after the finger puncture. The ordinate represents the electrical resistance, when the bridge is balanced, of resistor 6 which runs through its 10 kilohm range in ten revolutions and is provided with a scale which enables the resistance introduced into the circuit to be measured.

The curve shown in FIG. 3 is obtained by balancing the bridge at half minute intervals, starting from the third minute, by adjusting resistor 6. From the 18th minute onwards the bridge was balanced less frequently as coagulation had already taken place. The balanced condition of the bridge was determined by the oscilloscope 9 showing a signal of minimum amplitude.

The first part of the curve shown in FIG. 3 shows a steep monotonic decrease in resistance down to a minimum value, which minimum is indicated by the arrow and which occurred at a time of about 11 ½ minutes measured along the abscissa. The electrical comparative resistance of the blood in the cell 3 subsequently increased to provide a rising part of the curve which is less steep and shows a few fluctuations.

During the monitoring of the blood comparative impedance in the cell 3, a control experiment was carried out with three additional tubes, each similar to the cells 2 and 3 and filled with blood from the same wound. The clotting of the blood in these three tubes was checked mechanically. The clotting times recorded by the control tubes lay between 10 ½ and 11 ½ minutes which corresponded closely with the minimum value of the impedance curve of 11 ½ minutes shown in FIG. 3.

The apparatus described not only provides a determination of the clotting time but is able to give information about the clotting process itself. The very small amount of blood required to fill the cells 2 and 3 and the simplicity of the measuring procedure enables frequent determination of the clotting time of the blood of an individual to be carried out at the bedside of a patient.

The apparatus may be modified in various ways.

In one modification a self-balancing bridge is used and a recording device enables an automatic record of a detailed curve representing the impedance changes to be obtained by recording the extent of bridge balancing necessary. A further modification is to allow the automatic filling of the cells from an intravenous catheter with an arrangement for automatic addition of heparin to the control cell 2 or having the control cell 2 constructed to delay clotting.

If desired the first derivative of the resistance-time curve may be obtained and the two cells automatically rinsed and refilled when the derivative is equal to zero corresponding to the first minimum value of the resistance curve of FIG. 3 being attained. In this way the automatic recording of changes in the clotting time of a patient's blood over prolonged periods may be achieved and can be used to control the anti-coagulant administered to the patient.

FIG. 4 shows a modified arrangement of bridge measuring circuit in which the bridge has blood-sample cells in each of its four arms. The sample cells are shown at $R_1$, $R_2$, $R_3$ and $R_4$. The pairs of diagonally opposite bridge terminals are shown at $a$, $b$ and $c$, $d$. The resistance arm $b - d$ contains a variable resistor 21 for bridge balancing and the bridge arm $a - d$ contains a small fixed resistor 20. With such an arrangement the provision of capacitors is unnecessary as the capacitance of the individual cells, being identically constructed, is the same.

In the apparatus shown in FIG. 4 the blood samples in the cells $R_1$, $R_3$ and $R_4$ are prevented from clotting by being heparinized.

The three cells $R_1$, $R_3$ and $R_4$ may be formed from a straight length of tubing having four electrodes 31 to 34 as shown in FIG. 4a. Each of the electrodes has a connection pin extending to it and the four pins provide the four terminals $a$, $b$, $c$ and $d$. The coagulation of blood in the three cells may be prevented by heparin or by siliconizing the internal surface of the tube.

In the straight tube shown in FIG. 4a various techniques may be used to provide the resistor 20 of FIG. 4. For example, the spacing between the electrodes defining cell $R_3$ in FIG. 4a may be increased to increase the resistance of the bridge arm $a - d$. This may result in some loss of reactance balance in the bridge as the increased spacing will diminish the capacitance. However a trimming capacitor shunting the terminals $a - d$ can be used to restore the capacitance to the same value as the other cells. The variable resistor 21 is connected externally as shown in FIG. 4a.

An alternative technique to changing the spacing between the electrodes is to reduce the resistances of all of the cells, with the exception of cell $R_3$, by shunting their respective bridge arms with identical resistors. The capacitance of the bridge arms will then be the same if the electrodes are equispaced from one another, but the resistance of the cell $R_3$ will be greater than the resistance of each of the other cells and the resistance difference can be balanced by means of a variable resistor connected as shown in FIG. 4a.

A third technique usable to increase the resistance of bridge arm $a - d$ is to form the electrode 32 as two separate but closely spaced cylindrical part-electrodes each having its own terminal pin leading out through the wall of the tube. The pins of the part-electrodes may be interconnected through to resistor 20 in FIG. 4 and one end of the resistor can then be used to provide the terminal $a$.

It will be appreciated that the tube shown in FIG. 4a may be provided with abutting blocks of graphite and silicone or suitably siliconized material alternating with one another along its bore and drilled out from one end to provide a hole passing through all of the blocks. The graphite blocks can be used to provide the electrodes and the silicone or siliconized blocks provide blood cells in which the coagulation of the blood is retarded.

In the modification of the invention shown in FIG. 5 all four cells of the bridge are formed in a single straight length of glass tube by providing inside the tube five identical cylindrical platinum electrodes 41 to 45. These may be provided by any of the methods mentioned with reference to FIG. 4a. Connecting pins extend radially through the glass wall of the tube from the cylindrical platinum electrodes and the pins associated with the electrodes 41 and 45 are joined to one another to provide terminal $c$ of the bridge circuit shown in FIG. 4.

The pins associated with the other three electrodes 42, 43 and 44 provide the terminals $b$, $d$ and $a$ of the bridge. The glass tube 40, but not of course the electrodes, is internally siliconized from the end 48 to the position of the electrode 42. The end 48 of the tube 40 is adapted to have a siliconized syringe needle attachment fitted to it so that it can be connected to a patient's vein. The cell $R_1$ of FIG. 4 is formed in FIG. 5, between the electrodes 44 and 45; the cell $R_3$ of FIG. 4 is formed, in FIG. 5, between the electrodes 43 and 44 which have a slightly increased space between them to provide also the resistor 20 of FIG. 4; the cell $R_4$ is provided between the electrodes 43 and 42 in FIG. 5 which are further spaced still further apart than the electrodes 43 and 44 and are externally shunted by a variable resistor 21' enabling the electrical resistance between the terminals $b$ and $d$ to be increased so that the bridge can be balanced; and the cell $R_2$ is provided between the electrodes 41 and 42 which have the same spacing between them as the electrodes 44 and 45 providing cell $R_1$. Inter-electrode capacitances of the four cells are matched by external trimming capacitors (not shown) connected between the electrodes. The cells $R_1$, $R_3$ and $R_4$ are internally siliconized to delay coagulation of the blood within them whereas the cell $R_2$ is not and therefore provides the test cell.

An intermittent suction device 51 draws blood through the tube at predetermined time intervals and at a controlled rate so that the electrodes of the tube can provide the bridge circuit of FIG. 4 which can be balanced periodically to determine the onset of blood clotting. A timer is shown at 52.

The arrangement shown in FIG. 5 may be modified in many ways. For example, the electrodes may be equi-spaced in the tube so that the provision of trimming capacitors to balance the electrical capacitances of the bridge arms is unnecessary. To provide the variations in resistance of the bridge arms they may be provided with shunting resistors appropriately selected.

Coagulation of the blood in the test cell may be detected by continually balancing the bridge or, if desired, by measuring the current in the bridge circuit c-b-d, for example, by monitoring the potential difference between the points a and b or by measuring the magnitude of a maximum potential which must be applied between terminals a and b to reduce the current flow therebetween to zero. It will be appreciated that the imbalance of the bridge progressively increases as the comparative impedance of the test cell falls if no counter measures are taken, and the imbalance attains a maximum when coagulation occurs. The maximum potential for each "run" may be recorded by a recorder on a chart to provide a clinician with an immediate up to date picture of the behavior of the patients blood clotting time during the preceding twenty-four hours. The bridge arrangement is naturally preferably automatically operated by the timer 52 so that continuous supervision is unnecessary.

Although the apparatus using a balanced bridge with a control cell identically constructed has been described with particular reference to blood clotting time, it may also be of use, by suitable adaptation, with other studies such as in the laboratory determination of prothrombin time or even coagulation in other liquids, monitoring the growth of bacterial cultures, antigen antibody reaction and even biochemical and chemical reactions.

The above described apparatus may be used to determine the clotting time of blood by either a comparison of the impedance of a sample under examination with the impedance of a control sample in a bridge circuit, or by measuring when the rate of change of comparative impedance attains a certain value. As the curve shown in FIG. 3 has a nearly linear initial portion which continues until a few minutes before the minimum value, the departure of the rate of change in resistance from a constant value to a lesser value may be used to indicate that coagulation is only a short time, measureable in minutes, away, this further time being found empirically. In this way the approach of the coagulation may be detected and remedial action taken before clotting actually takes place. Such a system of control would be of particular importance if a patient was being infused with an anti-coagulant.

Although the invention has been described with reference to increasing the clotting time of a patient, it will be understood that it may equally well be used in order to monitor the amount of treatment necessary for a patient in certain bleeding disorders.

I claim:

1. The method of detecting coagulation of a fluid sample comprising the steps of:
    placing the sample in electrical circuit with a source of electrical energy;
    causing said energy to pass principally through portions of said sample adjacent its periphery whereby changes in electrical impedance of said sample which are indicative of coagulation will take place over a period of time, said changes in electrical impedance being in the nature of lowering to a minimum and thereafter beginning to rise from said minimum upon coagulation of said sample;
    monitoring said electrical impedance and determining from said monitoring the rate of lowering of said impedance; and
    terminating said step of monitoring prior to said electrical impedance reaching said minimum whereupon the time of coagulation may be predicted from said determination of said rate of lowering of said impedance.

2. The method according to claim 1 including the step of removing said sample from said electrical circuit prior to coagulation.

3. The method of detecting coagulation of an obtained biological fluid sample comprising the steps of:
    dividing said sample into two parts;
    delaying coagulation of one of said parts of said sample;
    placing each of said parts individually in electrical circuit with a source of electrical energy;
    causing said electrical energy to pass principally through portions of said sample adjacent its periphery for a given period of time sufficient to allow for changes in electrical comparative impedance of at least one of said parts to take place, said changes in electrical comparative impedance being indicative of coagulation of said sample; and
    monitoring said changes in comparative electrical impedance for detecting coagulation of said sample.

4. The method according to claim 3 wherein said changes in electrical comparative impedance will be in the nature of lowering to a minimum and thereafter beginning to rise from said minimum upon coagulation of said sample and said step of monitoring is continued at least until said electrical comparative impedance of said sample reaches said minimum whereby detection of coagulation is effected.

5. The method according to claim 3 wherein said changes in said electrical comparative impedance will be in the nature of lowering to a minimum and thereafter beginning to rise from said minimum upon coagulation of said sample, determining from said monitoring the rate of lowering of said comparative impedance and terminating said step of monitoring prior to said electrical comparative impedance reaching said minimum whereupon the time of coagulation may be predicted from said determination of said rate of lowering of said comparative impedance.

6. The method according to claim 3 including the step of removing said parts of said sample from said electrical circuit prior to said coagulation.

7. The method according to claim 3 including the additional step of timing the interval between obtaining the sample and said detection of coagulation for determining the time required for coagulation of said sample.

8. Apparatus for detecting coagulation of a fluid sample including:
  a cell having a chamber for receiving said sample, said cell being formed of a number of abutted apertured blocks having apertures thereof in aligned relationship with each other to form said chamber, a second and fourth of said blocks being formed of an essentially electrically non-conductive sample coagulation retarding silicone material and the remaining blocks being formed of an essentially non-coagulation retarding electrically conductive graphite material;
  a number of spaced electrodes in said cell each being in peripheral contact with said sample when said sample is in said chamber;
  a source of electrical energy, said source of energy being in electrical circuit with said electrodes for passing electrical energy principally through portions of said sample adjacent its periphery in said chamber; and
  means for indicating the impedance of said sample to said passage of electrical energy therethrough for detecting said coagulation.

9. Apparatus for detecting coagulation of a fluid sample including:
  a cell having a chamber for receiving said sample, said cell comprising a tube of electrical insulating material having a bore constituting said chamber;
  a number of spaced electrodes in said cell each being in peripheral contact with said sample when said sample is placed in said chamber, said electrodes being in the form of spaced electrically conductive linings against the wall of said bore;
  a sample coagulation retarding medium extending between at least two of said electrically conductive linings peripherally about the length of said chamber between said two linings;
  a source of electrical energy, said source of energy being in electrical circuit with said electrodes for passing electrical energy principally through said portions of said sample adjacent its periphery in said chamber;
  electrical leads extending laterally through said tube to said electrically conductive linings and connected in electrical circuit with said source of electrical energy; and
  means for indicating the impedance of said sample to said passage of electrical energy therethrough for detecting said coagulation of said sample.

10. Apparatus for detecting differences in instantaneous electrical comparative impedances of two parts of a liquid sample medium comprising:
  a pair of cells each having a liquid holding chamber and spaced electrodes within said chamber between which a part of said sample medium is positioned, one of said cells comprising three blocks of structural material, said blocks being apertured and positioned in abutting relationship with each other with respective apertures therein all aligned to form said liquid-holding chamber, the intermediate one of said blocks being formed of silicone and remaining blocks being formed of graphite;
  a source of electrical energy having electrical output terminals;
  a pair of electrical circuits connected in parallel to said output terminals, said circuits each including at least one electrical impedance bridge arm, with electrodes in one of said cell chambers being serially connected in circuit with one of said arms and the electrodes in the other of said cell chambers being serially connected in circuit with the other of said arms; and
  means responsive to current in said pair of circuits for indicating differences in instantaneous comparative impedances of said parts of said sample medium.

11. A cell for use in determining coagulation of liquid samples comprising:
  a tube of electrical insulating material;
  a first block of electrically insulating sample coagulation retarding silicone material within said tube intermediately of its length;
  second and third blocks of electrically conductive essentially non-coagulation-retarding graphite material one abutting each of opposite ends of said first block within said tube;
  said blocks each having a centrally disposed bore therein, said bores being in coaxial communication with one another; and
  electrical conductors extending through said tube one into electrically connected relationship with each of said second and third blocks.

12. Apparatus for monitoring one or more selected activities of a chemical, bio-chemical or biological process in a medium, characterized by receptacles (2, 3) for one or more test samples and one or more control samples of the medium, means to inhibit or activate the selected activity or activities in the one or more test samples, but not the one or more control samples, or vice versa, and means (1) to monitor changes in a relationship between the electrical impedance(s) of the test sample(s) on the one hand and the electrical impedance(s) of the control sample(s) on the other hand over a period of time to provide an indication of progress of the one or more selected activities.

13. Apparatus for monitoring at least one selected activity of a process, in the class of chemical, bio-chemical and biological processes in a medium, characterized by receptacles for at least one test sample and at least one control sample of the medium, means for at least permitting occurrence of the selected activity in the at least one test sample, means for at least inhibiting occurrence of the selected activity in the at least one control sample, and means to monitor changes in a relationship between the electrical impedances of the at least one test sample on the one hand and of the at least one control sample on the other hand over a period of time to provide an indication of progress of the selected activity.

14. The method of detecting coagulation of a fluid sample comprising the steps of:
  dividing said sample into two parts;
  delaying coagulation of one of said parts of said sample;
  placing each of said parts individually in electrical circuit with a source of electrical energy;
  causing said electrical energy to pass principally through portions of said sample adjacent its periphery for a given period of time sufficient to allow for changes in electrical comparative impedance of at least one of said parts to take place, said changes in electrical comparative impedance being indicative of coagulation of said sample; and
  monitoring said changes in comparative electrical impedance for detecting coagulation of said sample.

15. Apparatus for detecting differences in instantaneous electrical comparative impedances of two parts of a liquid sample medium comprising:
  a pair of cells each having a liquid holding chamber and spaced electrodes within said chamber between which first and second parts of said sample medium are respectively positioned, one of said cells having liquid sample coagulation retarding means within its liquid holding chamber intermediately of said spaced electrodes thereof and said other of said cells being essentially non-retarding to liquid sample coagulation between corresponding spaced electrodes thereof within its chamber;
  a source of electrical energy having electrical output terminals;
  a pair of electrical circuits connected in parallel to said output terminals, said circuits each including one electrical impedance bridge arm, the electrodes in one of said cell chambers being serially connected in circuit with one of said arms and the electrodes in the other of said cell chambers being serially connected in circuit with the other of said arms; and
  means responsive to current in said pair of circuits for indicating differences in instantaneous comparative impedances of said first and second parts of said sample medium.

* * * * *